US006843724B2

(12) United States Patent
Walker et al.

(10) Patent No.: US 6,843,724 B2
(45) Date of Patent: Jan. 18, 2005

(54) ELECTRONIC AMUSEMENT DEVICE OFFERING SECONDARY GAME OF CHANCE AND METHOD FOR OPERATING SAME

(75) Inventors: Jay S. Walker, Ridgefield, CT (US); James A. Jorasch, Stamford, CT (US); Magdalena Mik, Greenwich, CT (US); Stephen C. Tulley, Stamford, CT (US); Robert R. Lech, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 10/752,068

(22) Filed: Jan. 6, 2004

(65) Prior Publication Data

US 2004/0142741 A1 Jul. 22, 2004

Related U.S. Application Data

(63) Continuation of application No. 10/029,143, filed on Dec. 27, 2001, now Pat. No. 6,692,353, which is a continuation of application No. 09/108,646, filed on Jul. 1, 1998, now Pat. No. 6,364,765.

(51) Int. Cl.[7] .......................... A63F 13/00; A63F 9/24; G06F 17/00; G06F 19/00; A63B 71/00

(52) U.S. Cl. ............................ 463/25; 463/16; 463/22; 463/29; 463/30; 463/40; 463/42; 273/138.1; 273/237; 273/269; 273/297

(58) Field of Search .............................. 463/16–30, 12, 463/13, 37, 40–43; 273/138.1, 142 B, 297, 293, 143 R, 142 R, 237, 269

(56) References Cited

U.S. PATENT DOCUMENTS

| | | | | | |
|---|---|---|---|---|---|
| 4,669,731 | A | | 6/1987 | Clarke | 273/143 R |
| 4,856,787 | A | | 8/1989 | Itkis | 273/237 |
| 5,083,271 | A | | 1/1992 | Thacher et al. | 364/411 |
| 5,179,517 | A | | 1/1993 | Sarbin et al. | 364/410 |
| 5,242,163 | A | | 9/1993 | Fulton | 273/85 CP |
| 5,342,047 | A | | 8/1994 | Heidel et al. | 273/85 CP |
| 5,356,140 | A | | 10/1994 | Dabrowski et al. | 273/85 CP |
| 5,393,057 | A | | 2/1995 | Marnell, II | 273/85 CP |
| 5,409,225 | A | | 4/1995 | Kelly et al. | 273/138 R |
| 5,544,892 | A | | 8/1996 | Breeding | 273/292 |
| 5,564,700 | A | | 10/1996 | Celona | 463/27 |
| 5,580,309 | A | | 12/1996 | Piechowiak et al. | 463/16 |
| 5,603,502 | A | | 2/1997 | Nakagawa | 273/292 |
| 5,611,730 | A | | 3/1997 | Weiss | 463/20 |
| 5,639,088 | A | | 6/1997 | Schneider et al. | 273/138.2 |
| 5,655,961 | A | | 8/1997 | Acres et al. | 463/27 |
| 5,695,400 | A | | 12/1997 | Fennell, Jr. et al. | 463/42 |
| 5,702,304 | A | | 12/1997 | Acres et al. | 463/29 |
| 5,741,183 | A | | 4/1998 | Acres et al. | 463/42 |
| 5,755,621 | A | | 5/1998 | Marks et al. | 463/42 |
| 5,761,647 | A | * | 6/1998 | Boushy | 705/10 |

(List continued on next page.)

FOREIGN PATENT DOCUMENTS

| | | |
|---|---|---|
| GB | 2 161 008 A | 1/1986 |

*Primary Examiner*—A. L. Wellington
*Assistant Examiner*—Binh-An D. Nguyen
(74) *Attorney, Agent, or Firm*—Magdalena M Fincham

(57) ABSTRACT

An electronic amusement device and a method for operating the device are disclosed. In accordance with the present invention, a slot machine server controls a secondary game of chance played at a client slot machine. The server receives a player identifier corresponding to a player and a client identifier corresponding to a client slot machine. The server retrieves registration data relating to a secondary game of chance corresponding to the player identifier and the client identifier. The server further receives an outcome from the client slot machine and analyzes the outcome based on game requirements associated with the secondary game of chance, thereby determining whether the outcome satisfies at least one of the game requirements. Once all of the game requirements have been satisfied, the server updates a session status indicating the completion of the game requirements.

14 Claims, 19 Drawing Sheets

U.S. PATENT DOCUMENTS 5,770,533 A * 6/1998 Franchi ........................ 463/42
5,811,772 A * 9/1998 Lucero ........................ 235/380
5,823,879 A 10/1998 Goldberg et al. ............. 463/42
5,836,586 A 11/1998 Marks et al. ............... 273/292
5,848,932 A 12/1998 Adams ........................ 463/20
5,882,260 A 3/1999 Marks et al. ................. 463/13
5,979,702 A 11/1999 Hennessey et al. ......... 221/206
5,980,384 A 11/1999 Barrie ......................... 463/16
6,019,374 A 2/2000 Breeding .................... 273/292
6,033,307 A 3/2000 Vancura ....................... 463/20
6,039,648 A 3/2000 Guinn et al. .................. 463/16
6,077,162 A 6/2000 Weiss .......................... 463/26
6,077,163 A 6/2000 Walker et al. ................ 463/26
6,089,975 A 7/2000 Dunn .......................... 463/16
6,093,100 A 7/2000 Singer et al. ................. 463/13
6,113,102 A 9/2000 Marks et al. ............... 273/292
6,135,882 A 10/2000 Kadlic ......................... 463/13
6,142,872 A 11/2000 Walker et al. ................ 463/16
6,264,560 B1 7/2001 Goldberg et al. ............. 463/42
6,287,202 B1 9/2001 Pascal et al. ................. 463/42
6,312,332 B1 11/2001 Walker et al. ................ 463/23
6,364,765 B1 4/2002 Walker et al. ................ 463/16

* cited by examiner

500

| | GAME IDENTIFIER 510 | NUMBER OF PLAYERS 512 | GAME TYPE 514 | GAME TIME LIMIT 516 | GAME PLAY LIMIT 518 |
|---|---|---|---|---|---|
| 550 | ABC | 1 | SOLO | N/A | 225 PLAYS |
| | BCD | 1 | SOLO | 45 MINS. | N/A |
| | CDE | 1 | SOLO | N/A | 150 PLAYS |
| 560 | DEF | 2 | COMBINATION | 60 MINS. | N/A |
| 570 | EFG | 6 | COMPETITION | N/A | N/A |
| | FGH | 3 | COMBINATION | 30 MINS. | N/A |

FIG. 5A 500 (CONT.)

| GAME BONUS AMOUNT 520 | CLIENT IDENTIFIERS 522 | GAME REQUIREMENTS 524 |
|---|---|---|
| $25 | YELLOW | COLLECT 100 LEMONS |
| $15 | YELLOW<br>BLUE<br>RED | OBTAIN CHERRY-CHERRY-CHERRY COMBINATION ON 1 YELLOW MACHINE, 1 BLUE MACHINE, AND 1 RED MACHINE |
| $30 | BLUE | OBTAIN 6 JACKPOTS WITH PAYOUTS > 20 TOKENS EACH WITHIN 150 PLAYS |
| $50 | BLUE<br>RED<br>DUECES WILD<br>ANY VIDEO POKER | 1.) CHERRY-CHERRY-CHERRY ON ANY BLUE MACHINE<br>2.) FLUSH HAND ON ANY VIDEO POKER MACHINE<br>3.) ANY WINNING OUTCOME ON ANY RED MACHINE<br>4.) 10 ACE OF SPADES ON ANY DEUCES WILD VIDEO POKER MACHINE |
| $20 | ANY SLOT<br>ANY VIDEO POKER<br>BLUE | 1.) ANY PAIR JACKS OR BETTER ON ANY VIDEO POKER MACHINE<br>2.) CHERRY-CHERRY-CHERRY ON ANY 3 REEL SLOT MACHINE<br>3.) 3 OF A KIND ON ANY VIDEO POKER MACHINE<br>4.) ORANGE-ORANGE-ORANGE ON ANY BLUE MACHINE WHILE WAGERING MAXIMUM AMOUNT |
| $20 | YELLOW<br>BLUE<br>RED | 1.) 10 CHERRIES ON AT LEAST ONE BLUE MACHINE<br>2.) 10 LEMONS ON AT LEAST ONE RED MACHINE<br>3.) 10 BARS ON AT LEAST ONE RED MACHINE |

FIG. 5B

600

| SESSION IDENTIFIER: 0326981418 610 | | | | |
|---|---|---|---|---|
| GAME IDENTIFIER: ABC 612 | | | | |
| PLAYER IDENTIFIER 614 | TIME REMAINING 616 | PLAYS REMAINING 618 | SESSION STATUS 620 | BONUS DUE 622 |
| 24681012 | N/A | 105 | ACTIVE | $0 |

650

700

| SESSION IDENTIFIER: 0326981418 710 | | | |
|---|---|---|---|
| PLAYER IDENTIFIER 711 | CLIENT IDENTIFIER 712 | OUTCOME 714 | TIMESTAMP 716 |
| 24681012 | SM 1002003 | LEMON | 3/26/98 03:15:30 PM |
| 24681012 | SM 1001098 | LEMON | 3/26/98 03:19:23 PM |

750
752

FIG. 6A

600

| SESSION IDENTIFIER: 0327981148 610 | | | | |
|---|---|---|---|---|
| GAME IDENTIFIER: DEF 612 | | | | |
| PLAYER IDENTIFIER 614 | TIME REMAINING 616 | PLAYS REMAINING 618 | SESSION STATUS 620 | BONUS DUE 622 |
| 36917154 | 60:00 MIN. | N/A | READY | $0 |
| 48129003 | 60:00 MIN. | N/A | READY | $0 |

652
654

700

| SESSION IDENTIFIER: 0327981148 710 | | | |
|---|---|---|---|
| PLAYER IDENTIFIER 711 | CLIENT IDENTIFIER 712 | OUTCOME 714 | TIMESTAMP 716 |

FIG. 6B

600

| | SESSION IDENTIFIER: 0328981012 610 | | | | |
|---|---|---|---|---|---|
| | GAME IDENTIFIER: EFG 612 | | | | |
| | PLAYER IDENTIFIER 614 | TIME REMAINING 616 | PLAYS REMAINING 618 | SESSION STATUS 620 | BONUS DUE 622 |
| 656 | 35791130 | N/A | N/A | SUCCESS | $20 |
| 658 | 24483696 | N/A | N/A | FAIL | $0 |

700

| | SESSION IDENTIFIER: 0328981012 710 | | | |
|---|---|---|---|---|
| | PLAYER IDENTIFIER 711 | CLIENT IDENTIFIER 712 | OUTCOME 714 | TIMESTAMP 716 |
| 754 | 35791130 | VP 8423456 | PAIR Q'S | 3/28/98 10:15:21 AM |
| | 24483696 | SM 15874953 | CH - CH - CH | 3/28/98 11:41:39 AM |
| | 24483696 | VP 8423456 | THREE 4'S | 3/28/98 12:38:46 PM |
| 756 | 35791130 | SM B657423 | OR - OR - OR | 3/28/98 1:51:22 PM |
| | 24483696 | VP 8659187 | PAIR K'S | 3/28/98 2:47:18 PM |
| 758 | 35791130 | SM B654213 | CH - CH - CH | 3/28/98 3:21:45 PM |
| 760 | 35791130 | VP 8659187 | THREE ACES | 3/28/98 4:10:17 PM |

FIG. 6C

ELECTRONIC AMUSEMENT DEVICE OFFERING SECONDARY GAME OF CHANCE AND METHOD FOR OPERATING SAME

The present application is a continuing application of U.S. application Ser. No. 10/029,143, filed Dec. 27, 2001 now U.S. Pat. No. 6,692,353 in the name of Walker et al. and entitled ELECTRONIC AMUSEMENT DEVICE OFFERING SECONDARY GAME OF CHANCE AND METHOD FOR OPERATING SAME;

which is a continuation application of U.S. application Ser. No. 09/108,646, filed Jul. 1, 1998 in the name of Walker et al., entitled ELECTRONIC AMUSEMENT DEVICE OFFERING SECONDARY GAME OF CHANCE AND METHOD FOR OPERATING SAME and which issued Apr. 02, 2002 as U.S. Pat. No. 6,364,765 B1.

The entirety of each of the above applications is incorporated by reference herein for all purposes.

BACKGROUND OF THE INVENTION

1. Field of the Invention

The present invention relates to an electronic amusement device and more particularly to an electronic amusement device such as a slot machine having the ability to conduct a secondary game of chance.

2. Description of the Related Art

In 1997, electronic amusement devices installed in U.S. casinos (including slot machines, video poker machines and the like, hereinafter referred to as "slot machines" or "machines") generated greater than ten billion dollars of revenue. With individual machines typically earning between $50 and $150 per day, slot machines often account for well over 50% of a U.S. casino's overall profits. The net profit from slot machine play for a casino typically exceeds the profit from all other casino activities.

The comparatively high profitability of slot machines may be attributed to many factors. One such factor is that slot machines typically offer a higher house advantage than other casino games. Further, slot machines typically enable a faster rate of play than other casino games. Another factor contributing to the higher profitability of slot machines is that slot machines may be enjoyable to players of every skill level. In addition, slot machines attract a large number of players by offering a large potential payout in exchange for a comparatively small wager. Slot machines also attract players who are intimidated by table games or other casino activities that require prior training or skill.

Because slot machine profitability is directly proportional to the speed of play, it would be advantageous for casino operators to encourage faster play at slot machines. It would further be desirable for casino operators to encourage players to try certain different types of slot machines. Specifically, casino operators would benefit from increased play at under-utilized machines, such as newer slot machines, older slot machines or slot machines located in a remote portion of a casino. Casino operators would also benefit from increased play on slot machines having a high house advantage and slot machines having a high maximum wager amount.

Presently, slot machines provide players with simple, passive entertainment. Although some recent slot machines enable a player to achieve rewards for nontraditional events, these slot machines do not require a player to perform any additional activities during game play.

An example of such a slot machine is disclosed by U.S. Pat. No. 5,639,088 entitled "Multiple Events Award System" of Schneider et al. (hereinafter referred to as "the '088 patent"). In the '088 patent, Schneider et al. disclose a system that enables a player to receive a large award for receiving a set of winning combinations within a preselected number of rounds of play. The system includes a central controller and a plurality of gaming machines. The gaming machines provide signals to the central controller representing a number of winning combinations and a number of rounds played. The central controller determines whether a player has received a set of winning combinations.

While the '088 patent enables a large award to be offered to a player, it fails to address certain problems with the prior art. Specifically, the '088 patent fails to encourage players to try certain different types of slot machines. The '088 patent also fails to increase play at under-utilized machines, such as older slot machines or slot machines located in a remote portion of a casino. The '088 patent further fails to direct players to slot machines having a high house advantage or slot machines having a high maximum wager amount.

Accordingly, it would be advantageous to provide a method and apparatus that encourages slot machine players to be directed to specific slot machines in a casino. Thus, it would be desirable to provide a method and apparatus which directs player traffic toward slot machines preferred by the casino, such as newer machines, highly profitable machines and otherwise under-utilized machines. It would further be desirable to provide a method and apparatus that encourages the active participation of a slot machine player, thus enhancing the gaming experience. Such a machine could result in significantly enhanced revenues for casino operators by attracting players who were previously uninterested in conventional slot play, while providing more enjoyable play for casino patrons.

SUMMARY OF THE INVENTION

An object of the present invention is to provide a method and apparatus for conducting a secondary game of chance to be played using multiple gaming devices. An advantage of the present invention is that it directs players to utilize slot machines designated by a casino operator. A further advantage of the present invention is that it encourages a wider variety of players to utilize slot machines.

In accordance with a first aspect of the present invention, an electronic amusement device and method is disclosed for directing a computing device to register a player to play a secondary game of chance at a slot machine configured to conduct a primary game of chance and the secondary game of chance. The method includes the step of receiving a request to register the player to play the secondary game of chance. The request to register includes a player identifier. The method also includes the step of determining a secondary game identifier corresponding to the secondary game of chance. The secondary game identifier is associated with a set of client identifiers on which the secondary game of chance may be played. The method further includes the step of storing the player identifier, the secondary game identifier and the set of client identifiers, thereby registering the player for the secondary game of chance. The disclosed server operating in conjunction with a registration kiosk implements the steps of the described method.

In accordance with a second aspect of the present invention, an electronic amusement device and method is disclosed for directing a computing device to conduct a secondary game of chance at a client slot machine. The method includes the steps of receiving a player identifier corresponding to a player, and retrieving player data, including a secondary game type and a secondary game status. The secondary game type corresponds to game requirements for determining a winner of the secondary game of chance, and further corresponds to a set of eligible client identifiers. The method also includes the steps of determining a client identifier corresponding to the client slot machine, and determining whether the client identifier is associated with one of the eligible client identifiers. The method further includes the step of determining an outcome. The outcome is analyzed based on the game requirements of the secondary game. If all of the game requirements have been satisfied, the secondary game status is updated to reflect completion of the secondary game.

BRIEF DESCRIPTION OF THE DRAWINGS

These and other objects, features and advantages of the invention will be understood from a consideration of the following description of the invention, in which:

FIGS. 5A–5B together comprise a table showing components of the secondary game definition table of FIG. 2;

FIGS. 6A–6C illustrate exemplary portions of the registration table and game outcome table of FIG. 2;

DETAILED DESCRIPTION OF THE INVENTION

By directing slot players to specific slot machines or types of slot machines, casino operators can more effectively utilize the valuable floor space of a casino. By encouraging players to move to higher profit machines or encouraging an idle player to play any machine, casinos can achieve a higher profit per machine. Directing slot players to particular machines also benefits players by enhancing or expanding their gaming experiences. Many players are unfamiliar with certain machines or don't normally frequent areas of a casino housing particular slot machines. Encouraging a player to play a slot machine offering secondary rewards makes the player's experience more exciting.

The present invention is directed to a method and apparatus for registering and conducting a secondary game of chance on multiple client slot machines of a slot machine network. The preferred embodiment will be described with reference to secondary games of chance that are modeled after a scavenger hunt game. It should be understood that the present invention will function equally well with many other types of secondary games of chance, and that the use of scavenger hunt games is merely one exemplary embodiment.

Definitions

As used herein, the following terms will have the corresponding definitions:

Slot Machine: Any electronic amusement or gaming device typically installed in a gambling establishment, including slot machines, video poker machines and video blackjack machines.

Outcome: A set of one or more game elements, such as slot reel symbols or playing cards, used to determine a single game result.

Completion Parameter: A parameter or rule defining a completion condition, such as a set of game requirements defining successful completion of a game or a time limit defining unsuccessful completion of a game.

Session: A single instance of a secondary game of chance.

Client Identifier: An identifier representing a specific client slot machine or a family of client slot machines.

Apparatus Architecture

Figure 1:
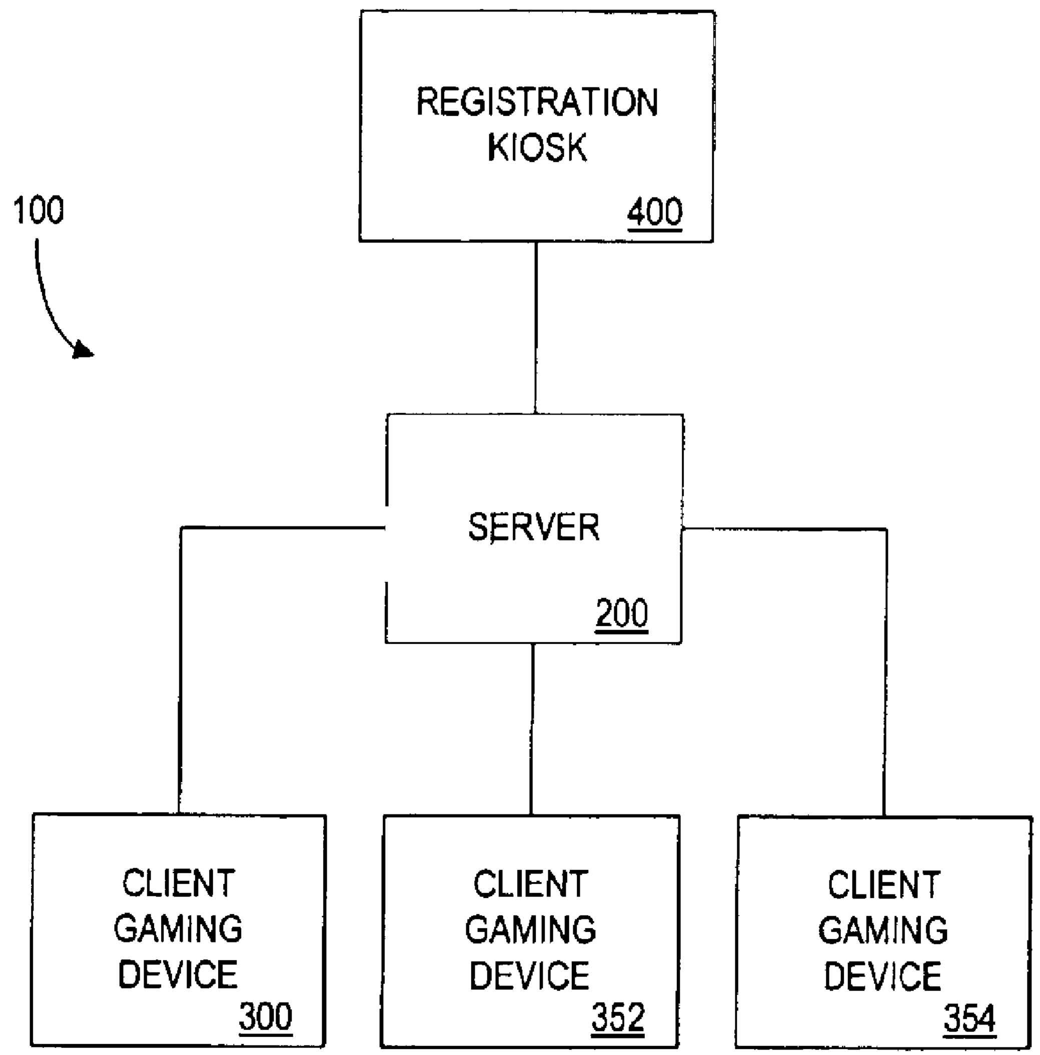
FIG. 1 is a block diagram illustrating a system for implementing the present invention.

The apparatus architecture of an exemplary embodiment of the present invention will now be discussed with reference to FIGS. 1–4. Referring to FIG. 1, there is shown a block diagram of a slot network 100. Network 100 includes a slot machine server 200 (hereinafter referred to as server) that is linked to and communicates with registration kiosk 400 and client gaming devices or slot machines 300, 352 and 354. Although three client gaming devices 300, 352 and 354 are shown, a person of ordinary skill in the art will appreciate that any number of client gaming devices could be linked to and in communication with server 200.

In the exemplary embodiment, a player utilizes kiosk 400 to register to play a secondary game of chance, such as a scavenger hunt game. Preferably, upon receiving a request from the player, kiosk 400 provides the player with a list of available secondary games for which the player may register. Kiosk 400 retrieves data regarding available games from server 200 and presents the data to the player. The available game data may be presented in any conventional manner including via a menu on a touchscreen. If a player wishes to register for an available game, kiosk 400 collects registration information supplied by the player and provides the player with a game identifier and directions to at least one client gaming device on which the player may play the secondary game of chance. Registration information might include a player tracking card with a corresponding player identifier, or it may include player-specified information such as his name, address, and credit card number. Kiosk 400 may collect registration information from the player in a number of ways, including via a player-tracking card, keyboard interface, scanner or pointing device.

The player utilizes a client gaming device, such as client gaming device 300, 352 or 354, to play a primary game of chance offered by the client gaming device as well as the secondary game of chance for which the player is registered. Slot server 200 communicates with kiosk 400 and client gaming devices 300, 352 and 354 to manage the secondary game of chance.

Figure 2:
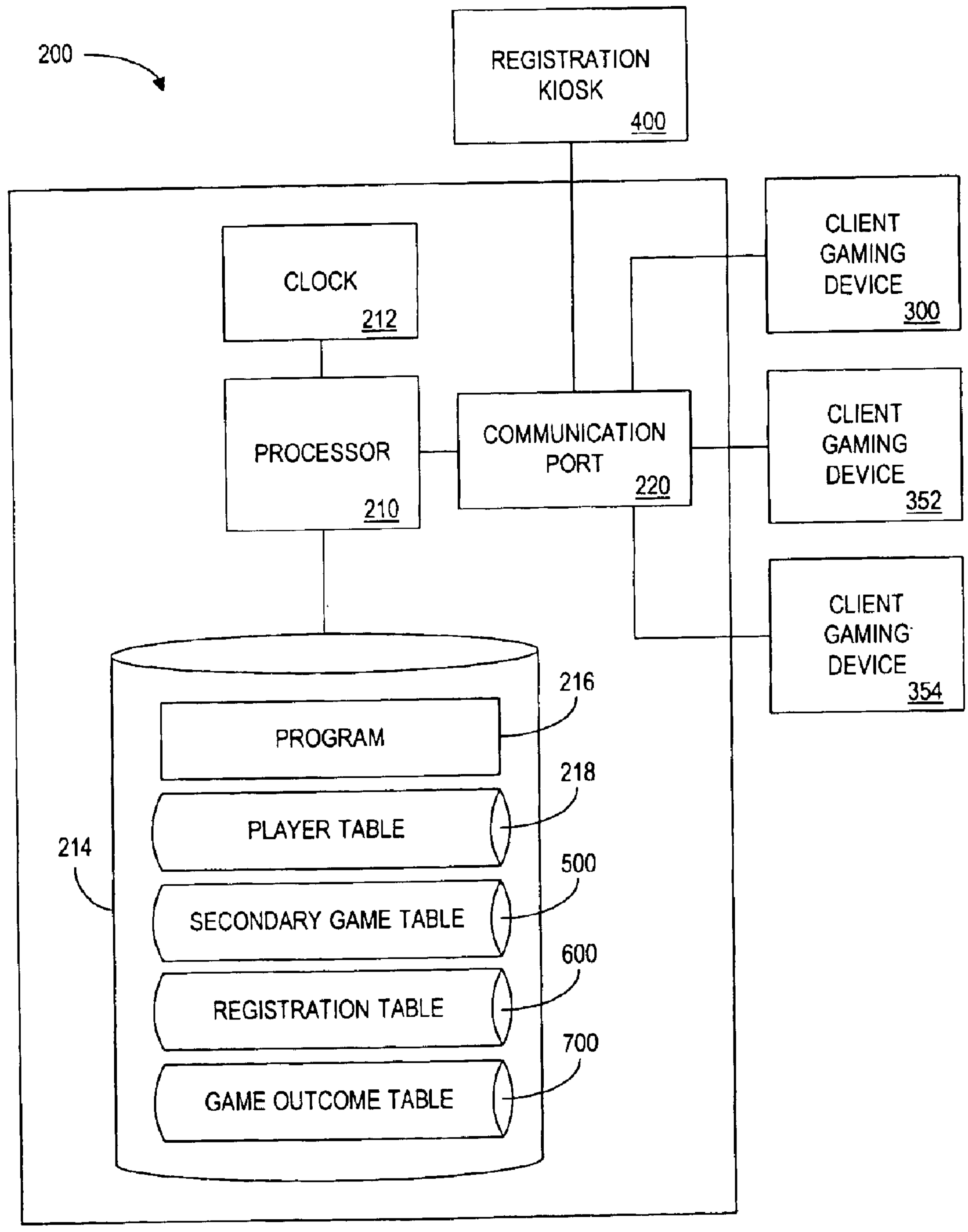
FIG. 2 is a block diagram of a slot server constructed in accordance with the present invention.

Referring now to FIG. 2, the architecture of slot server 200 is illustrated. In addition to conventional server components, such as random access memory (not shown) and read only memory (not shown), slot server 200 includes a processor 210 linked to a clock 212, a storage device 214 and a communication port 220. Communication port 220 enables server 200 to communicate with registration kiosk 400 and client gaming devices 300, 352 and 354. Storage device 214 comprises an appropriate combination of magnetic and optical memory, such as disk drive memory, and semiconductor memory such as random access memory and read only memory, and contains program 216 for controlling server 200 in accordance with the present invention. Among other functions, program 216 includes instructions for registering a player for a secondary game of chance via kiosk 400, instructions for managing and controlling a secondary game of chance played at a client gaming device, and instructions for dispensing an award for successfully completing a secondary game of chance. Storage device 214 further includes relevant data, including player table 218, secondary game table 500, registration table 600 and game outcome table 700. The data stored by storage device 214 are described in more detail with reference to FIGS. 5–7. Although the data of the exemplary embodiment is stored at server 200, in alternate embodiments, the data may be distributed among server 200, kiosk 400 and client gaming devices 300, 352 and 354.

Figure 3:
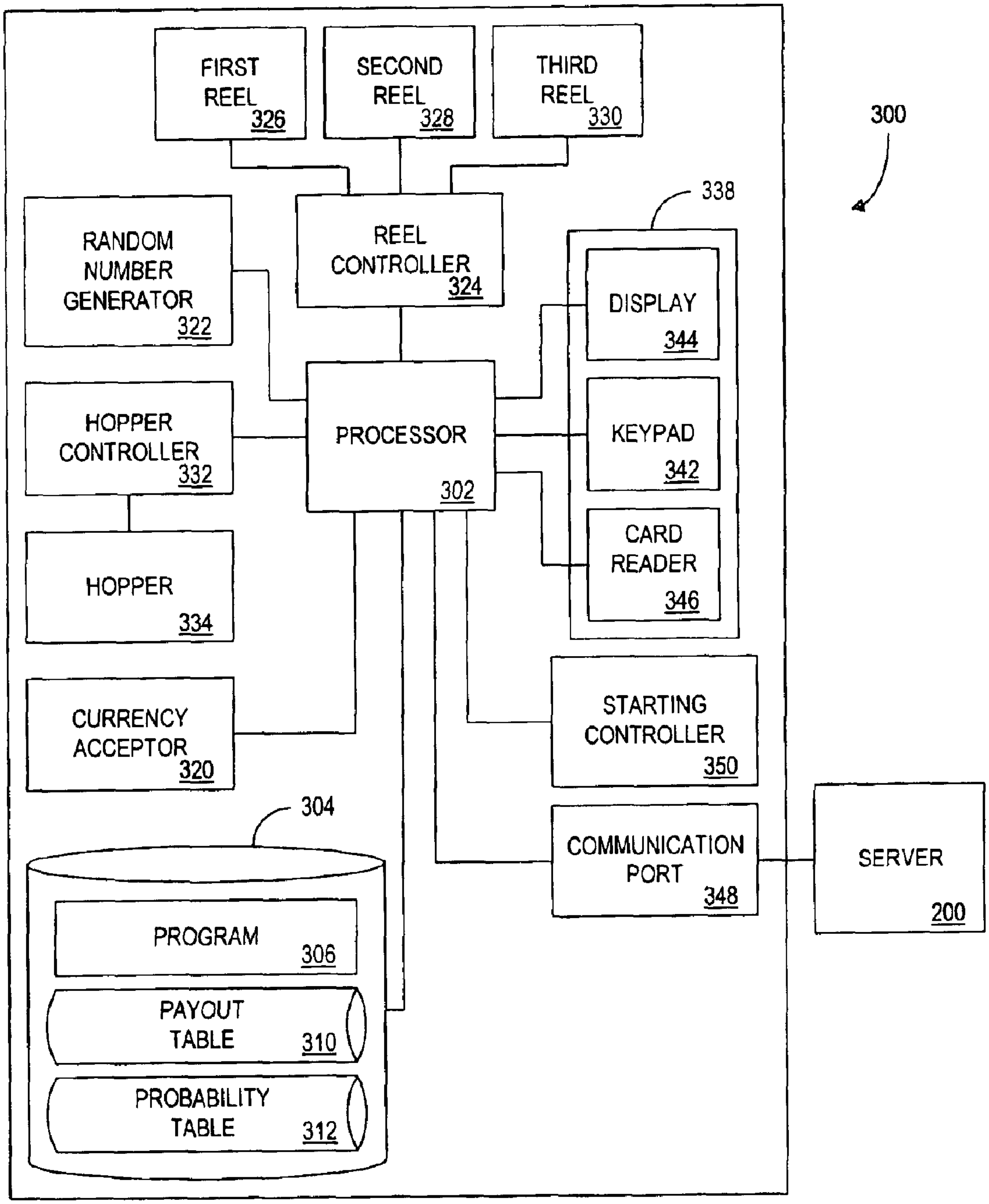
FIG. 3 is a block diagram of a client gaming device constructed in accordance with the present invention.

Referring now to FIG. 3, the architecture of slot machine or client machine 300 is illustrated. Slot machine 300, which is substantially similar to slot machines 352 and 354, is controlled by processor 302 and communicates with slot server 200 via communication port 348. Processor 302 is connected to storage device 304 which stores program instructions and data for operating slot machine 300 in accordance with the present invention, including program 306, payout table 310 and probability table 312. Program 306 includes instructions for conducting the primary game of chance and instructions for conducting the secondary game of chance. Further connected to processor 302 are a player card tracking device 338, a random number generator 322, a reel controller 324, three reels 326, 328 and 330, a hopper controller 332 and associated hopper 334 and a currency acceptor 320.

As illustrated, slot machine 300 generally comprises conventional components, with the exception of the program instructions and data stored in storage device 304. For purposes of better illustrating the invention, standard components, well known to those skilled in the art, are described only briefly. Although the present embodiment of the invention is described as implemented with physical components, the invention applies equally well to and includes software embodiments such as would be implemented on the Internet and other computer data networks.

Referring again to processor 302, the slot machine 300 comprises one of many well known processing units, for example a Pentium class processor manufactured by Intel Corp. Data storage device 304 comprises an appropriate combination of magnetic and optical memory, such as disk drive memory, and semiconductor memory such as random access memory and read only memory. In addition to the program instructions and data shown in FIG. 3, storage device 304 stores appropriate operating system and control software (not shown), functional to operate gaming device 300 in the manner described below. Random number generator 322 comprises one of many well known random or pseudo-random number generators suitable for use in a gaming device.

Currency acceptor 320 is operative to receive one or more coins or bills, and to transmit an appropriate value signal to processor 302. Hopper controller 332, and hopper 334 connected thereto, are operative under the control of processor 302 to dispense coins to a player. Starting controller 350 comprises a player-operated device such as a handle or button for initiating the play of a game.

Player card tracking device 338 comprises a player tracking interface including a card reader 346 for receiving a player tracking card, a display 344 for communicating messages to the player, and a keypad 342 for receiving player input such as a player identifier. In addition to storing the player identifier, the player tracking card could be configured to store outcomes generated by slot machine 300 and other play related data, therefore obviating the need for registration table 600 and outcome table 700.

Figure 4:
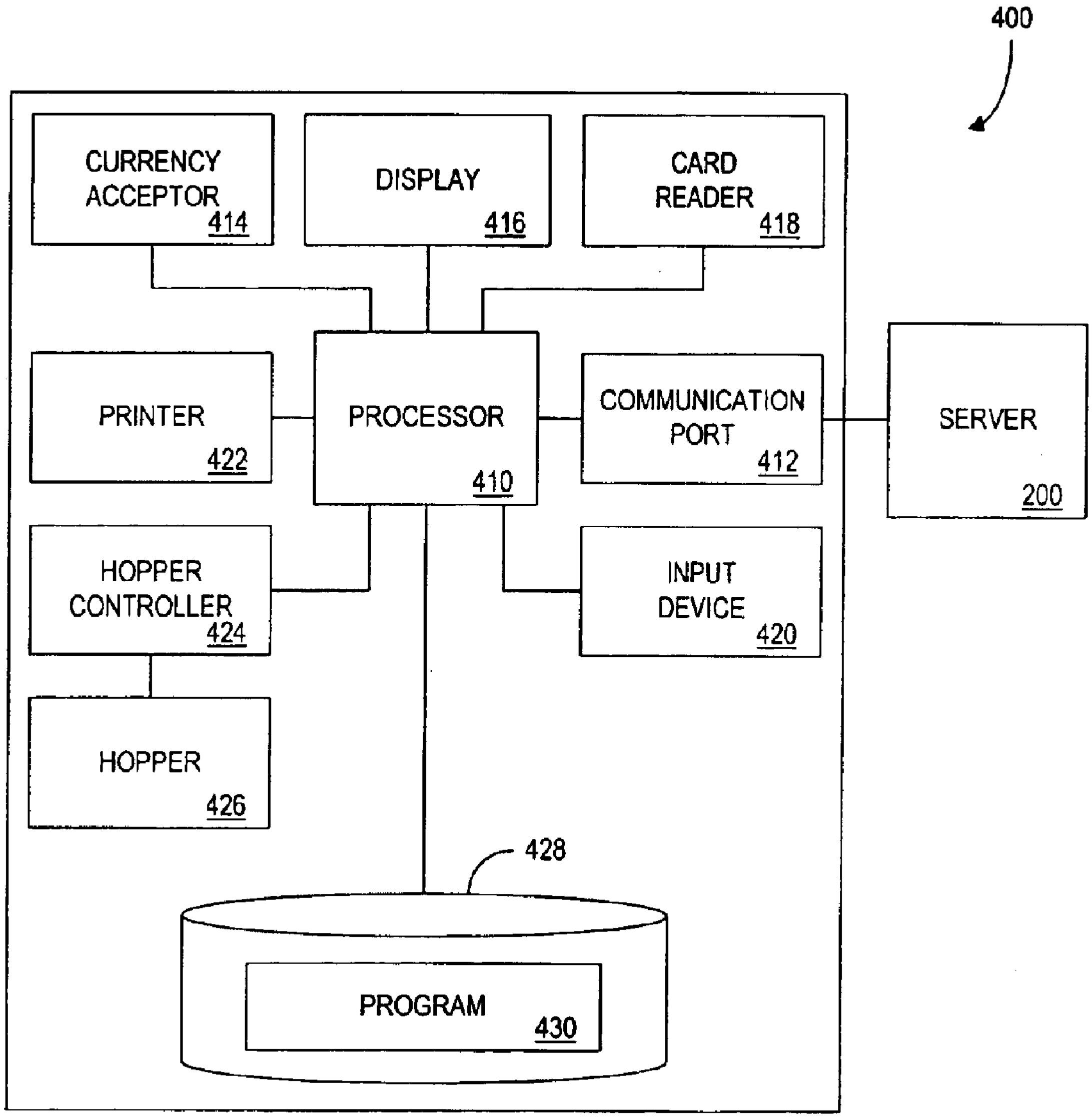
FIG. 4 is a block diagram of a registration kiosk constructed in accordance with the present invention.

Referring now to FIG. 4, the architecture of registration kiosk 400 is illustrated. Kiosk 400 enables a player to register for a secondary game of chance and, in one embodiment, redeem winnings accumulated during the secondary game of chance. Kiosk 400 is controlled by processor 410 and communicates with slot server 200 via communication port 412. Processor 410 is connected to storage device 428 that stores, among other things, program 430. Program 430 includes instructions enabling a player to register for a secondary game and instructions enabling a player to redeem bonus amounts awarded for successful completion of a secondary game.

Kiosk 400 includes input devices, such as currency acceptor 414 for receiving currency from the player, card reader 418 for reading a player tracking card, and input device 420 for receiving input from the player. Currency acceptor 414 enables kiosk 400 to accept a registration fee for the secondary game of chance, or pre-payment for the primary game of chance, in accordance with alternate embodiments of the present invention.

Kiosk 400 further includes output devices, including display 416 for displaying messages to the player, printer 422 and hopper controller 424 for dispensing currency via associated hopper 426. Printer 422 enables kiosk 400 to print receipts, reports, game instructions and coupons redeemable for free games, dinner, merchandise or cash. Hopper controller 424 enables kiosk 400 to dispense payment for awards earned for successful completion of the secondary game of chance.

Data Tables

Referring now to FIG. 5, there are illustrated six representative records of an exemplary secondary game table 500. Each record of secondary game table 500 defines the parameters of a secondary game that may be played, in addition to a primary game, at a client gaming device. Each record of secondary game table 500 includes a game identifier 510 that uniquely identifies the record and corresponds to the secondary game of chance that the record represents.

Each record of secondary game table 500 further includes field 512 that stores data representing the number of players required to play the associated secondary game. Game type field 514 stores data representing the type of secondary game. For example, record 550, having a game type of "SOLO," represents a single player game in which a single player must fulfill game requirements 524 to achieve a bonus. Record 560, having a game type of "COMBINATION," represents a multiple-player game in which the players cooperate as a team to collect outcomes which fulfill game requirements 524 to achieve a bonus. Record 570, having a game type of "COMPETITION," represents a multiple-player game in which the players compete to be the first to collect outcomes which fulfill the game requirements to achieve a bonus. Secondary games may be defined so that game requiring multiple players have more requirements than single player games, and the greater the number of required players, the longer or more complex the list of requirements.

Each record of secondary game table 500 further includes a number of parameters which define a secondary game, including a game time limit field 516, game play limit field 518, game bonus amount field 520 and client identifiers field 522. Game time limit field 516 stores a time value that represents the maximum amount of time within which a player must collect the required game elements or outcomes to qualify for an award. Game play limit field 518 stores a value representing the maximum number of plays within which a player must collect the required slot symbols to qualify for an award. A single play might represent the pull of a traditional slot machine handle, completion of a final hand in video poker or completion of one hand of blackjack. Game bonus amount field 520 stores a monetary value that a player is awarded for completing the game requirements. Of course the bonus could be paid to a single player, divided among a group of players, or provided in full to each of a group of players. In addition to a bonus, a player successfully completing a secondary game of chance could win the right to play another game. This would enable tournament play among secondary game players.

Client identifiers field 522 stores the client identifiers of the client gaming devices on which the secondary game may be played. In the preferred embodiment, each client identifier stored in field 522 represents a family or type of slot machine, however, embodiments in which each client identifier stored in field 522 represents a specific slot machine are also envisioned. Of course, client identifier field 522 may store data representing a rule for identifying one or more client gaming devices. For example, in an embodiment in which descriptive client identifiers are assigned to client gaming devices (e.g. slot machine identifiers begin with "SM" and video poker identifiers begin with "VP"), client identifier field 522 may store a rule limiting eligible client gaming devices to those beginning with "SM."

In addition, each record of secondary game table 500 includes at least one field defining the requirements of the corresponding secondary game. As illustrated, game requirements field 524 stores a definition of the requirements of each secondary game. Of course, one of ordinary skill will realize that game requirements field 524 is merely exemplary, and in practice, the requirements of each secondary game may be defined by multiple fields containing defining parameters. Alternatively, the requirements of each secondary game may be implemented through program instructions.

As illustrated, the game requirements require the player to collect specific outcomes from designated machines. The game requirements could easily require an order in which the player must collect the outcomes. For example, the player might have to complete requirements on lower denomination machines before progressing to higher denominations. An order of individual machines could also be specified, allowing the casino to distribute play over a fixed number of machines by specifying a different starting machine for each secondary game registered for that particular set of client machines.

Game requirements could also specify a minimum number of client machines on which a player must play in order to successfully complete the secondary game. By specifying a time window for play, the casino could encourage more play during off-peak times. For example, secondary games might only be available for play Monday through Thursday from 10:00 AM to 2:00 PM.

It is also envisioned that the outcomes designated by the secondary game requirements may consist entirely of game elements or outcomes that do not constitute winning outcomes in the primary game. In other words, in order to achieve an outcome required by the secondary game, a player must forego a winning outcome in the primary game of chance, and vice versa.

Much of the information stored in secondary game table 500 is presented to a player at kiosk 400 during a registration process. Kiosk 400 receives a request to register the player for a secondary game, and displays the available games, as defined in secondary game table 500, to the player for selection. Upon receiving a game selection from the player, kiosk 400 may direct the player to the associated client gaming devices by displaying, printing or otherwise providing the player with a map of the casino floor, with the associated machines explicitly identified on the map. For ease of explanation, the present invention is disclosed with respect to an embodiment in which the casino color-codes certain types of machines in order to make them easy to recognize. This could be done by placing a placard or other visible sign on each associated machine, clearly marking its color code designation. In embodiments in which a particular order of client machines is required in order to satisfy the secondary game requirements, the map might indicate a preferred or required route, perhaps through the use of arrows or shading. In this embodiment, a player that is required to receive a cherry-cherry-cherry outcome on a blue machine simply has to look around for a machine with the blue placard on it. Server 200 recognizes an eligible client based on a client identifier received from the client machine. Server 200 may use the client identifier directly to determine whether a player may use the client device to play the secondary game. Alternatively, server 200 may use the client identifier to reference a client eligibility table (not shown) to indirectly determine whether a player may use the client device to play the secondary game.

In addition to the type of games illustrated, many other types of games could be implemented. For example, the player may be required to receive three cherry-cherry-cherry outcomes before he receives five lemon-lemon-lemon outcomes. As described with reference to FIGS. 6A–6C, server 200 would keep track of the player's cherry-cherry-cherry outcomes and lemon-lemon-lemon outcomes. If the player collects three cherry-cherry-cherry outcomes before he collects five lemon-lemon-lemon outcomes, the player is successful and is eligible to receive the bonus associated with the game. If, however, the player receives five lemon-lemon-lemon outcomes before receiving three cherry-cherry-cherry outcomes, the player is unsuccessful, and is not eligible to receive the associated bonus.

Although the records of secondary game table 500 are preferably populated by experienced casino personnel who understand the subtleties of maximizing the efficient use of the casino floor, server 200 may be programmed to automatically generate records for secondary game table 500 based on historical data collected from client devices 300, 352 and 354. For example, as one of ordinary skill will appreciate, historical coin-in data may be collected from client devices 300, 352 and 354. Server 200 could be programmed to analyze the coin-in data and to rank the client devices. In order to promote play on the lower ranked client devices, server 200 might be programmed to generate a record in secondary game table 500 to provide a secondary game directed to the lower ranked client devices.

Referring now to FIG. 6A, an exemplary record 650 from registration table 600 and two corresponding records 750 and 752 from game outcome table 700 are shown. Each record of registration table 600 represents a session of a secondary game for which a player is registered. Registration table 600 includes a session identifier 610 uniquely identifying the registration record. In the preferred embodiment, session identifier 610 is generated for the session by the server based on the date and time of registration. Registration table 600 further includes a game identifier 612 and a player identifier 614 for identifying the secondary game and the player associated with the session. Game identifier 612 is populated with the data from game identifier field 510 of the appropriate record from secondary game table 500, and player identifier 614 is populated with the player identifier of the registered player. Player identifier 614 is preferably generated and assigned by the casino, but could take the form of a personal identification number (PIN) selected by player. Player identifier 614 is captured at kiosk 400 during a registration process. Player identifier 614 may be read from a player tracking card inserted into card reader 418, or may be provided via input device 420.

Registration table 600 further includes fields for tracking the progress of the player toward completion of the game requirements. Time remaining field 616 stores a time value representing the amount of time available for the player to complete the game requirements. The time available could be tracked individually for each player, or for a team of players. In such a team embodiment, the time remaining for each team member begins counting down with the first player inserting his player tracking card. For an individual player, the amount of time remaining could be frozen each time the player ended a particular series of plays by removing his player tracking card, with the time starting to count down only after the card was again inserted. Alternatively, time remaining field 616 could begin to count down immediately following registration by the player, encouraging the player to immediately begin playing the secondary game. Plays remaining field 618 stores a value representing the number of plays available for the player to complete the game requirements. Initially, time remaining field 616 and plays remaining field 618 are populated with data from game time limit field 516 and game play limit field 518 of the appropriate record from secondary game table 500, respectively.

Session status field 620 stores a code representing a status of the corresponding session. Examples of valid session status codes are listed in Table I, below. In the preferred embodiment, a session is successfully completed when the player satisfies the corresponding game requirements. A session is unsuccessfully completed when the player has not satisfied the game requirements and there is no time or plays remaining. Of course, various other session completion parameters are possible. Bonus due field 622 stores a monetary value representing a bonus due to the player for successfully completing the session. Although an unsuccessfully completed session will result in a bonus due amount of zero, it should be understood that varying degrees of success may be defined by the game requirements, resulting in varying bonus due amounts.

TABLE I

| Session Status Code | Session Status Definition |
|---|---|
| READY | A player has been registered to play a session of a game. |
| ACTIVE | A session of a game is in progress. |
| SUCCESS | A player successfully fulfilled the game requirements for the session. |
| FAIL | A player failed to successfully fulfill the game requirements for the session. |
| PAID | A bonus for successfully completing the game requirements has been paid to the player. |

Each record of game outcome table 700 represents a game outcome that contributes to the successful completion of the session. Game outcome table 700 includes a session identifier 710 that identifies the session corresponding to the game outcome. Game outcome table 700 also includes player identifier 711, outcome 714 and client identifier 712 for respectively documenting a player, an outcome fulfilling a game requirement (e.g. a reel symbol, set of reel symbols or card values) and the client gaming device that generated the outcome. Game outcome table 700 preferably includes a timestamp field 716 for storing the date and time the associated outcome was generated. Timestamp field 716 may be used to audit winning games. In alternate embodiments, timestamp field 716 may be used to cause outcomes to expire after a pre-specified period of time or number of plays.

The records shown in FIG. 6A describe a session of game ABC being played by a player having player identifier 24681012. To successfully complete game ABC, the player must receive 100 lemons during the session of up to 225 plays as defined by record 550 of secondary game table 500, previously described with reference to FIG. 5. According to session status field 618 of record 650, the session is "ACTIVE," or in progress. Although the player was initially allotted 225 plays to complete the game requirements of game ABC, plays remaining field 624 indicates that the player has completed 120 plays and has 105 plays remaining to complete the game requirements. As shown by records 750 and 752 of game outcome table 700, player 24681012 has received two lemons while playing slot machines having client identifiers SM-1002003 and SM 1001098.

The records shown in FIG. 6B describe a session of game DEF being played by two players having player identifiers 36917154 and 48129003. To successfully complete game DEF, the players must cooperate to achieve the game requirements defined by record 560 of secondary game table 500, previously described with reference to FIG. 5. According to session status field 620 of record 652, the session has been registered, but play has not begun. The initial allotment of sixty minutes is stored in time remaining field 616 of records 652 and 654. Because the secondary game has not started, there are no relevant records in game outcome table 700 relating to session 0327981148.

The records shown in FIG. 6C describe a completed session of game EFG, a competitive game between two players having player identifiers 35791130 and 24483696. To successfully complete game EFG, a player must be the first to collect four outcomes: (i) a pair of jacks or better on any video poker machine, (ii) a cherry-cherry-cherry outcome on any three reel slot machine, (iii) three-of-a-kind on any video poker machine, and (iv) orange-orange-orange on any blue machine while wagering the maximum amount, as illustrated by record 570 of FIG. 5. As shown by records 754, 756, 758 and 760, the player having player identifier 35791130 successfully completed the game requirements.

Description of the Operation

Figure 7:
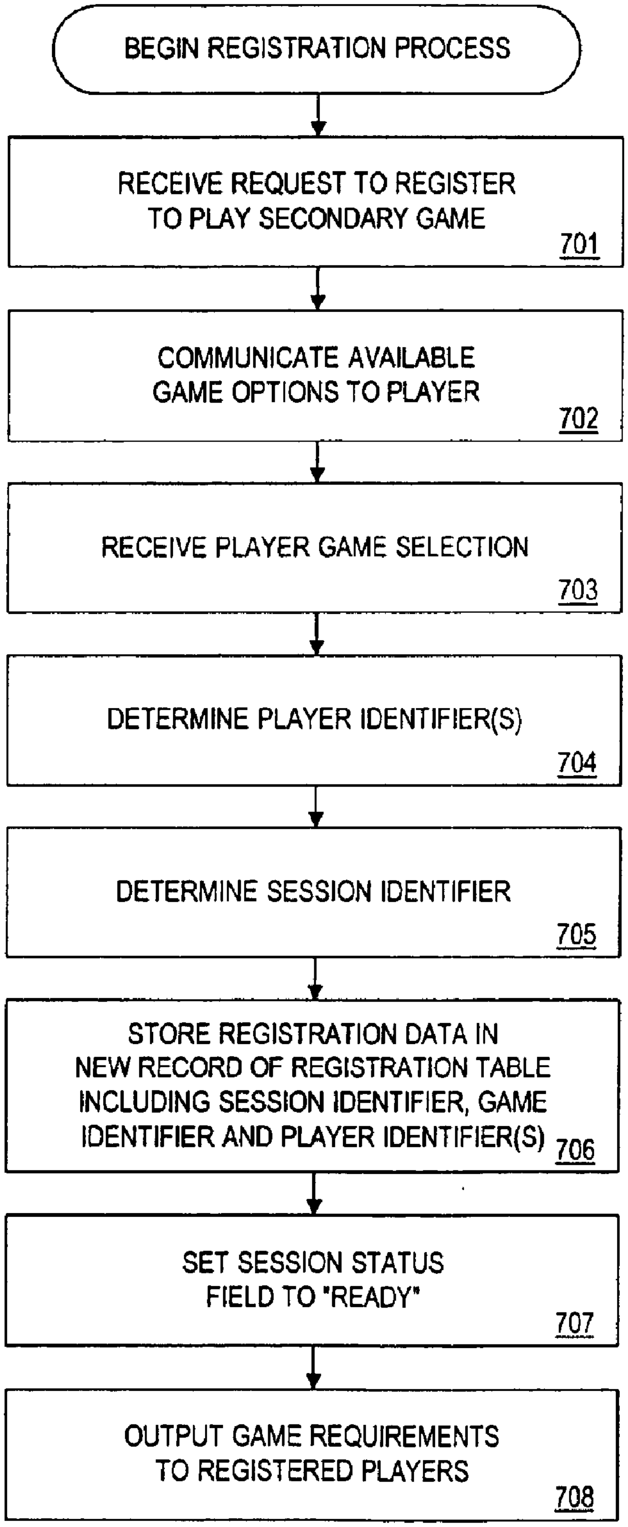
FIG. 7 is a flowchart illustrating a method for registering a player to play a secondary game of chance in accordance with the present invention.

Having thus described the architecture and components of the slot network of the present embodiment, the operation of the apparatus will now be described in greater detail with reference to FIGS. 7–9. FIG. 7 is a flowchart illustrating an exemplary registration process; FIGS. 8A–8G together comprise a flowchart illustrating an exemplary secondary game control process; and FIG. 9 is a flowchart illustrating an exemplary redemption process. These flowcharts describe a preferred embodiment in which server 200 facilitates registration and redemption processes via kiosk 400, and game play via client gaming device 300. It should be understood, however, that the processes do not strictly require the described client-server architecture. For example, a gaming device providing a single player secondary game of chance could conduct registration, game play and redemption processes at a single unit.

Referring now to FIG. 7, an exemplary registration process is illustrated in the form of a flowchart. The registration process enables a player to select a secondary game in which to participate. The registration process preferably interfaces with the player on the casino floor via kiosk 400, but may be accomplished by a client gaming device 300.

At block 701, processor 410 receives a request to register a player for a secondary game of chance and forwards the request to slot server 200 via communication port 412. At block 702, slot server 200 retrieves data describing the available games from secondary game table 500 and transmits the data to kiosk 400 where processor 410 causes the data to be communicated to the player via display 416.

Kiosk 400 receives the game selection of the player at block 703. The player may indicate a game selection using a touch screen or by providing a game identifier from a list of games provided at block 702. At block 704, processor 410 determines at least one player identifier, and at block 705 processor 410 determines a session identifier. The number of player identifiers determined at block 704 is based on the number of players required to play the selected game. The player identifiers may be determined in a number of ways including receiving a player identifier from a player tracking card inserted into card reader 418, receiving a player-selected PIN, or generating a unique player identifier at the time of registration.

If the selected game requires multiple player identifiers, the registration process instructions of program 430 will enable multiple identifiers to be collected and verified. If the appropriate number of player identifiers are not received, kiosk 400 may display a message indicating that the identifiers were not received or were invalid.

For example, if the player requests to register for a three player game, he must provide two player identifiers in addition to his own. If the player fails to provide the correct number of player identifiers, his request to register for the secondary game will be rejected. In an alternate embodiment, players who do not have player tracking cards (or previously assigned player identifiers) but still wish to participate in a secondary game of chance may be provided with a PIN that will serve as their identifier for the duration of the game. The PIN may be either player-selected or generated by the system. Each player registered for a game will receive a unique PIN which may be input by the player via keypad 342 prior to playing a secondary game.

At block 706, processor 410 transmits registration data including the session identifier, game identifier and player identifier(s) to server 200 which creates a new record in registration table 600 and stores the registration data in the new record. At block 707, server processor 202 sets session status field 620 to "READY." The requirements of the selected game are output to the player at block 708. An illustration of such output is described with reference to FIG. 10. The output could alternatively take the form of a map showing the player the locations of various client gaming machines associated with the particular secondary game, printed in real-time or developed in advance as a brochure with casino promotional materials.

Instead of providing detail regarding the identity of each client machine, the registration process could identify a first client machine with subsequent client machines identified during play of the secondary game. Thus, the player does not know where he is heading in advance, receiving the identification of his next client machine from display 344 of client machine 300. The player might also not be informed of the exact requirements of the secondary game until it was underway. For example, the player might achieve a required outcome of lemon-lemon-lemon and then receive identification of the next game requirement from display 344 such as bell-bell-bell.

Referring now to FIGS. 8A–8G, an exemplary secondary game control process is illustrated in the form of a flowchart. The illustrated secondary control process is performed by slot server 200, for every outcome generated by a client gaming device, in accordance with program 216.

Generally, if the player operating the client gaming device is registered for a game, server 200 will determine the type of game based on the game identifier, and direct the gaming device to execute the appropriate game play steps. If the player is not registered for a game, server 200 will not execute any steps to control a secondary game of chance. Once server 200 determines that the player is registered for a secondary game, it will update the time remaining and/or plays remaining while the player's player tracking card is in the gaming device, and store any of the player's outcomes that satisfy a game requirement. Server 200 will further store the client identifier of the client gaming device on which the outcome was generated, as well as the player identifier of the player playing the game. The record of the game outcome table is linked to the player's record of the registration table through a session identifier and the player's player identifier. In an alternate embodiment, server 200 could be programmed to continue to update the time remaining field of secondary games in progress so that if a player moves from one machine to another, the time remaining will continue to decrease. In the alternate embodiment, server 200 would continually update the time remaining from the time the player begins playing the secondary game until the completion of the game, regardless of whether the player removes the player tracking card from the gaming device.

In a multi-player team embodiment (either combined or competitive), the server keeps track of each player's results in the manner described above. In the competitive multi-player team embodiment, server 200 monitors each player's outcomes in substantially real time, and terminates the game once a player fulfills all of the game requirements. In an alternate embodiment, server 200 could track the time each player's outcome was obtained, in order to determine which player was the first to fulfill all of the requirements of the game.

At block 810, processor 210 receives a player identifier, client identifier and outcome from client gaming device 300. The player identifier, client identifier and outcome are transmitted by client gaming device 300 after a play of the machine. The transmission is performed in accordance with program 306.

At block 812, processor 210 determines whether a record corresponding to the received player identifier is registered for a secondary game of chance and whether the client identifier is among the eligible client identifiers associated with the secondary game. If a corresponding record does not exist, no further processing is required to control a secondary game of chance because the player associated with the received player identifier is not registered for a secondary game of chance that may be played at client gaming device 300. If registration record corresponding to the received player identifier and client identifier exists, secondary game processing continues.

At block 814, processor 210 retrieves registration data from the identified record of registration table 600. Processor 210 retrieves game data from an appropriate record of secondary game table 500, as shown by block 816. The appropriate secondary game table record is determined based on the contents of game identifier field 612 retrieved at block 814. At decision block 818, processor 210 determines whether the retrieved session status field 620 contains "READY" or "ACTIVE." If the retrieved registration record does not have a session status of either "READY" or "ACTIVE," the registered game is complete, and processing terminates. Otherwise, at block 820 of FIG. 8B processor 210 determines whether the session status field contains "READY." If it does, the session status is set to "ACTIVE" at block 822 to indicate that the session is in progress. At blocks 824 and 826, process flow is directed based on whether the secondary game is a single player game, a multi-player competitive game or a multi-player combination game.

Figure 8A:
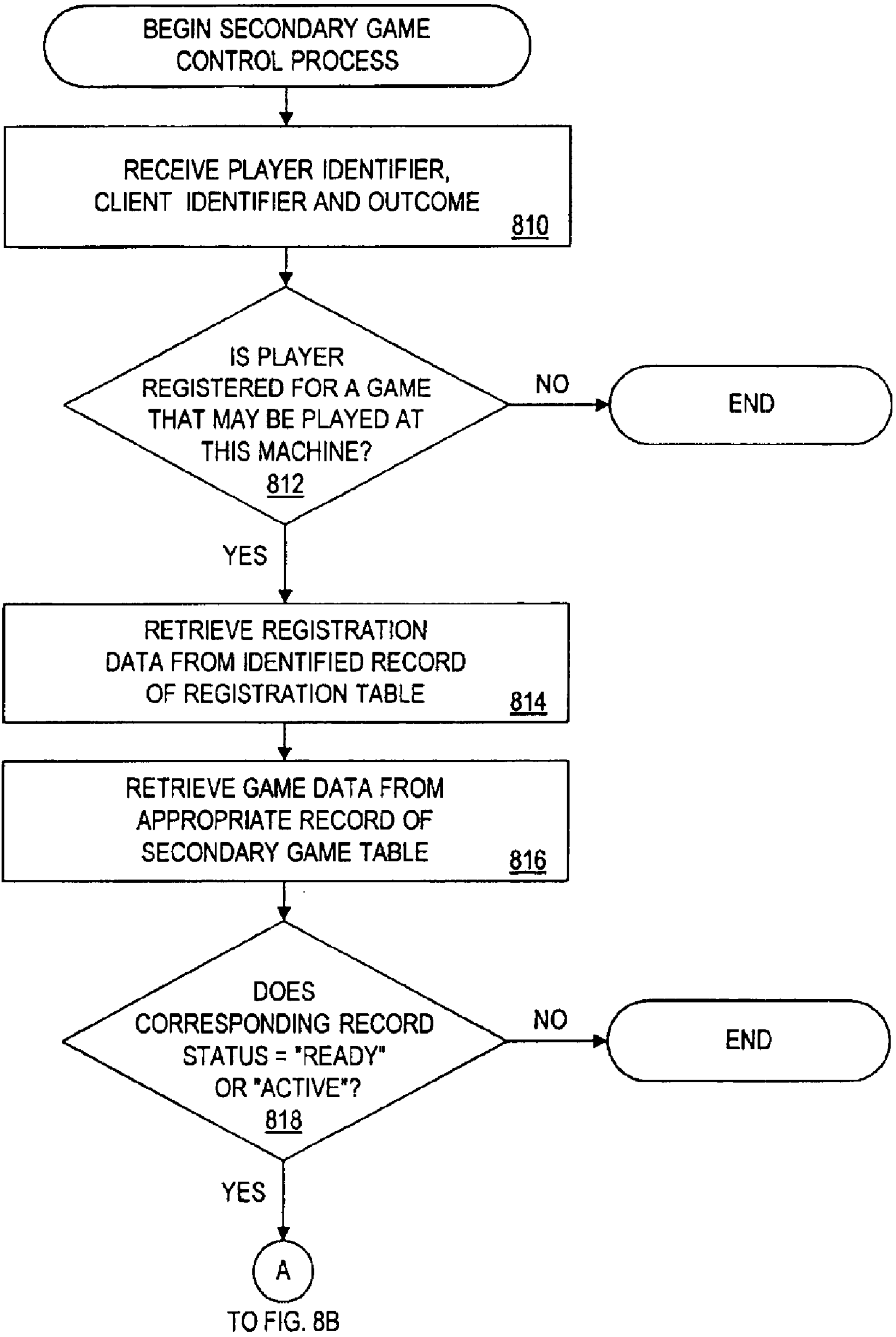
FIGS. 8A–8G together comprise a flowchart illustrating a method for a slot server to control a secondary game of chance in accordance with the present invention.
Figure 8B:
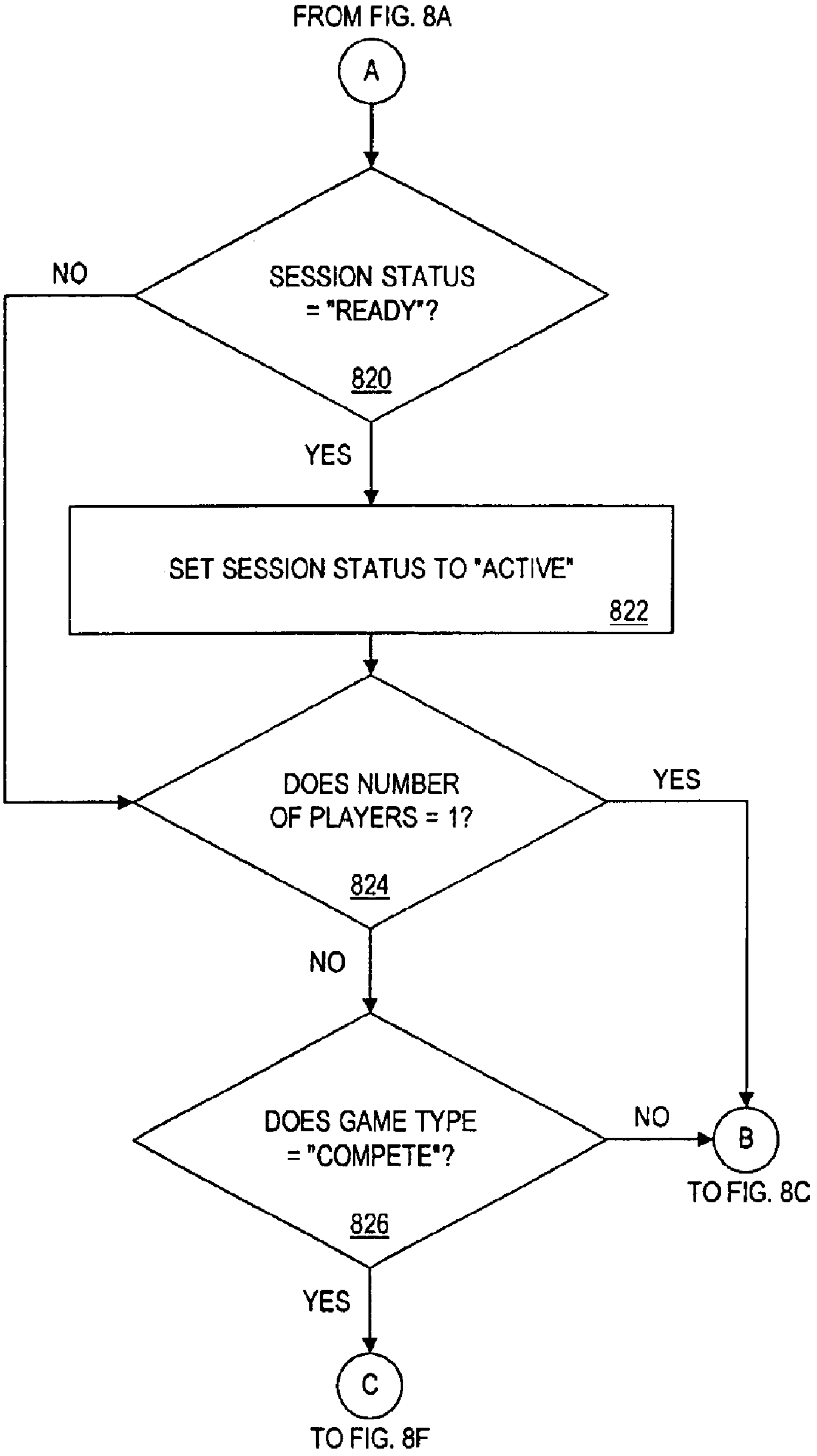
Figure 8C:
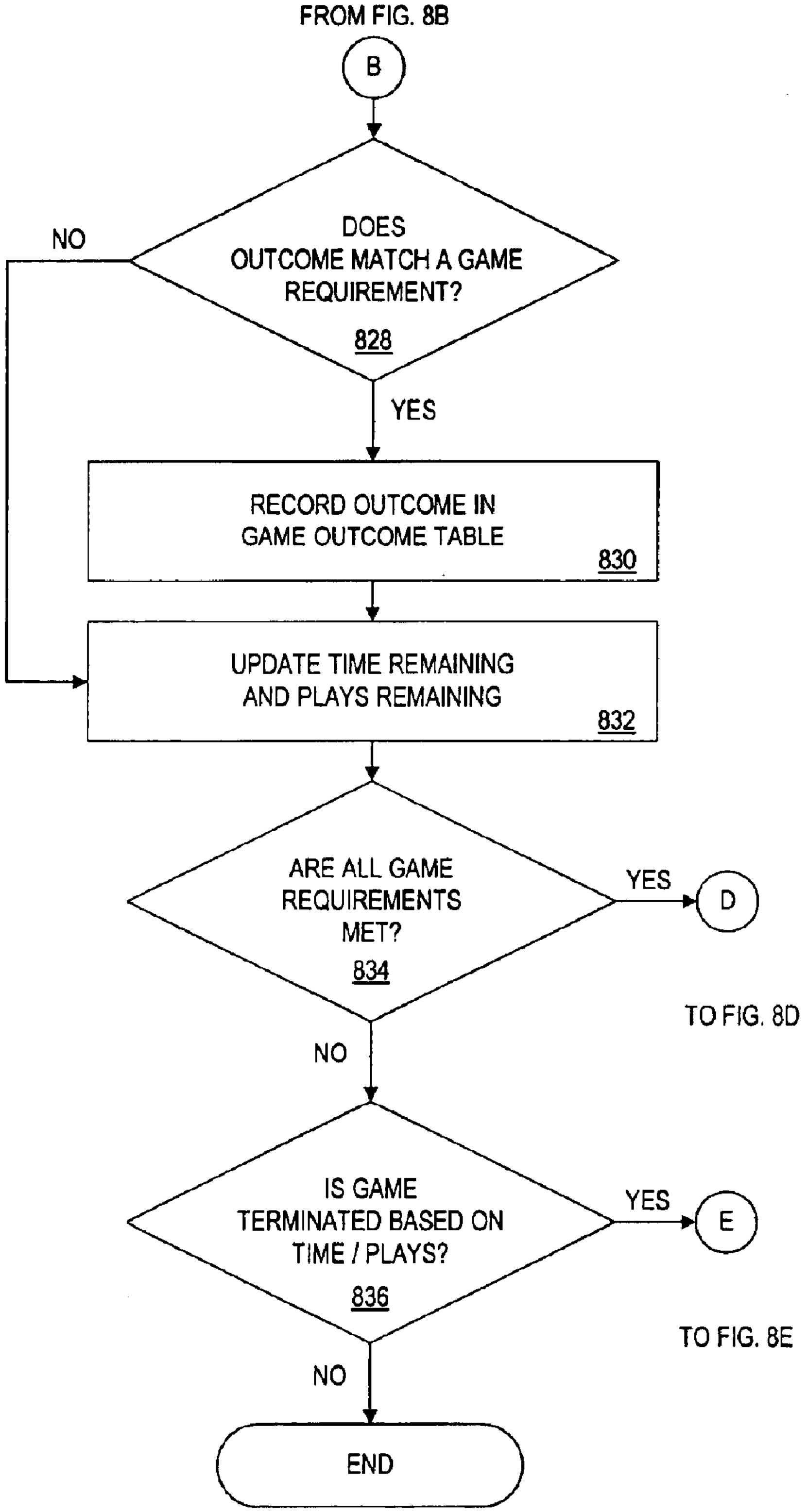

If the secondary game is a single player game or a multi-player cooperative game, process flow is directed to block 828 of FIG. 8C. At block 828, processor 210 determines whether the outcome, or any portion of the outcome, matches a game requirement. If the outcome fulfills a game requirement, the outcome is recorded in game outcome table 700, as shown by block 830. At block 832, the time remaining and plays remaining fields of registration table 600 are updated. Processor 210 then determines whether all of the game requirements have been met at decision block 834. If all of the game requirements have been satisfied, processing is directed to block 838 of FIG. 8D, enabling the player to be informed of his success in substantially real time. Otherwise, processor 210 determines whether the game should be terminated due to the lack of remaining time or remaining plays. According to decision block 836, if the game should be terminated, processing is directed to block 850. Otherwise, the secondary game control process terminates. It should be noted that the process flow may be altered to enable the player to be informed of his success or failure at the end of the allotted time/plays without deviating from the spirit and scope of the present invention.

Figure 8D:
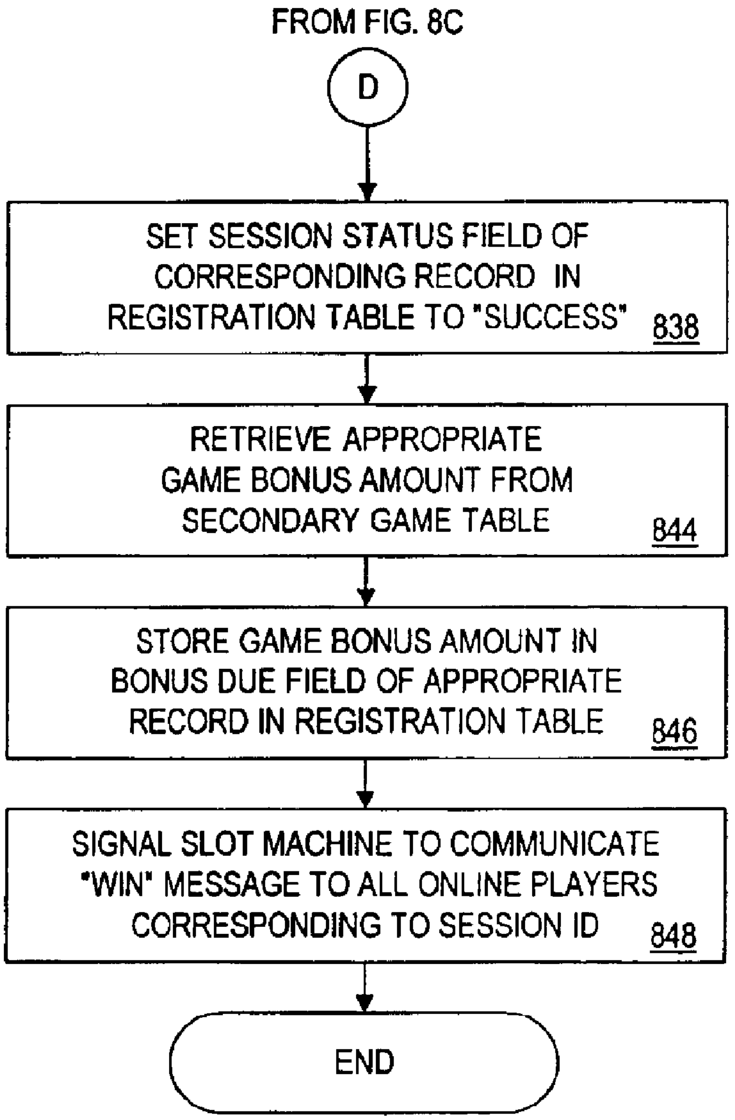
Figure 9:
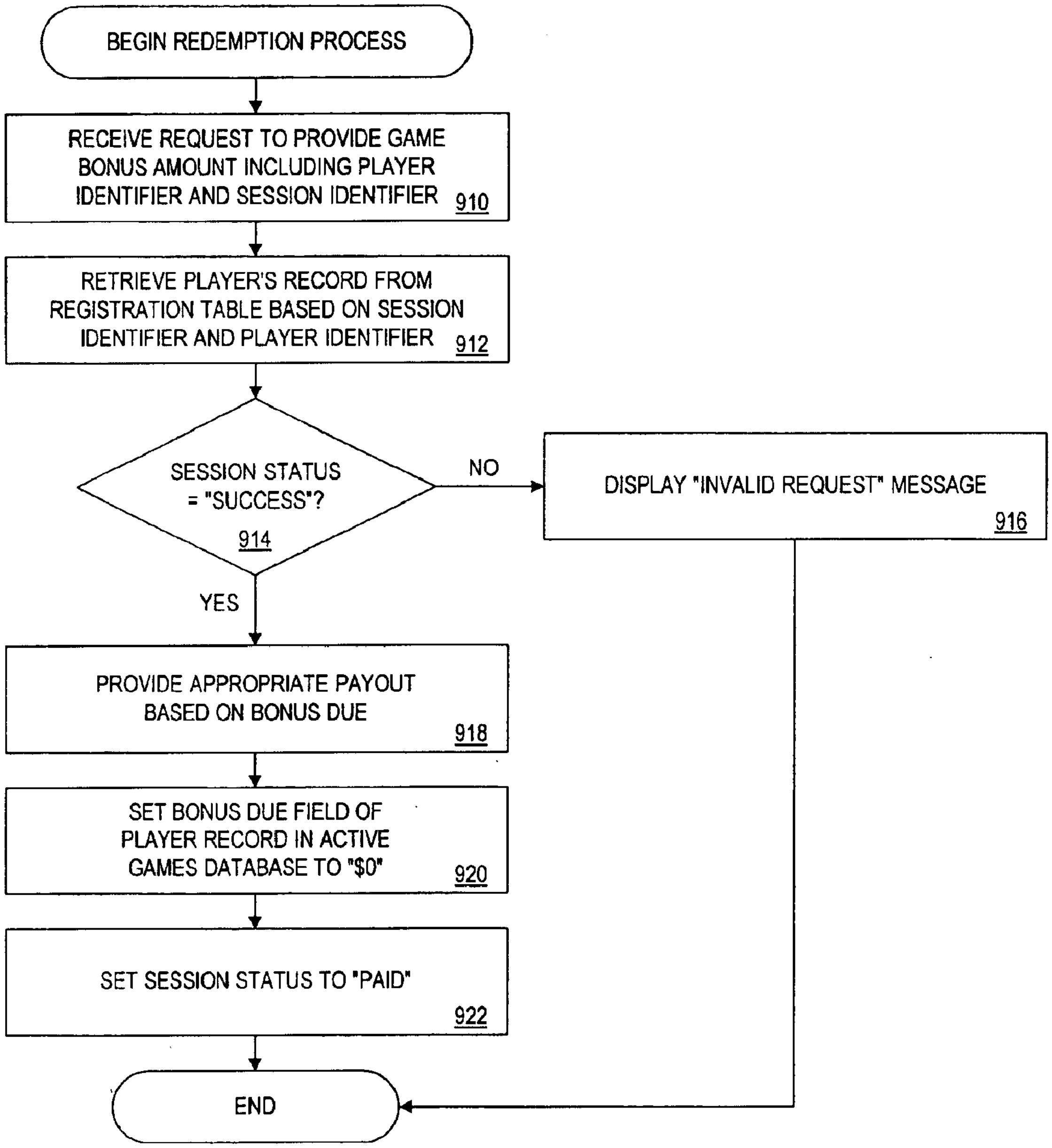
FIG. 9 is a flowchart illustrating a method for redeeming winnings awarded during a secondary game of chance.

Referring now to FIG. 8D, there are illustrated the steps processor 210 executes if a player wins a single player game or cooperative multi-player game. At block 838, processor 210 is directed to set the session status field 620 of the corresponding record of registration table 600 to "SUCCESS." Processor 210 then retrieves game bonus amount 520 from the appropriate record of secondary game table 500 and stores the retrieved amount in the bonus due field 622 of the corresponding record of registration table 600, as shown by blocks 844 and 846. In an alternate embodiment, instead of analyzing whether a player has satisfied the game requirement in real time, server 200 may be programmed to determine success or failure of a player only after expiration of the time remaining or number of plays remaining.

At block 848, processor 210 causes a signal to be transmitted to all client gaming devices on which a player associated with the session identifier is playing. The signal directs the client gaming devices to display a message indicating that the player has successfully completed the game requirements. In a multi-player game, all players are to be notified of the successful completion of the game requirements. If server 200 is unable to direct a message to a player because the player is not presently operating a gaming device, the message may be queued for delivery as soon as the player resumes operation of a client gaming device.

Figure 8E:
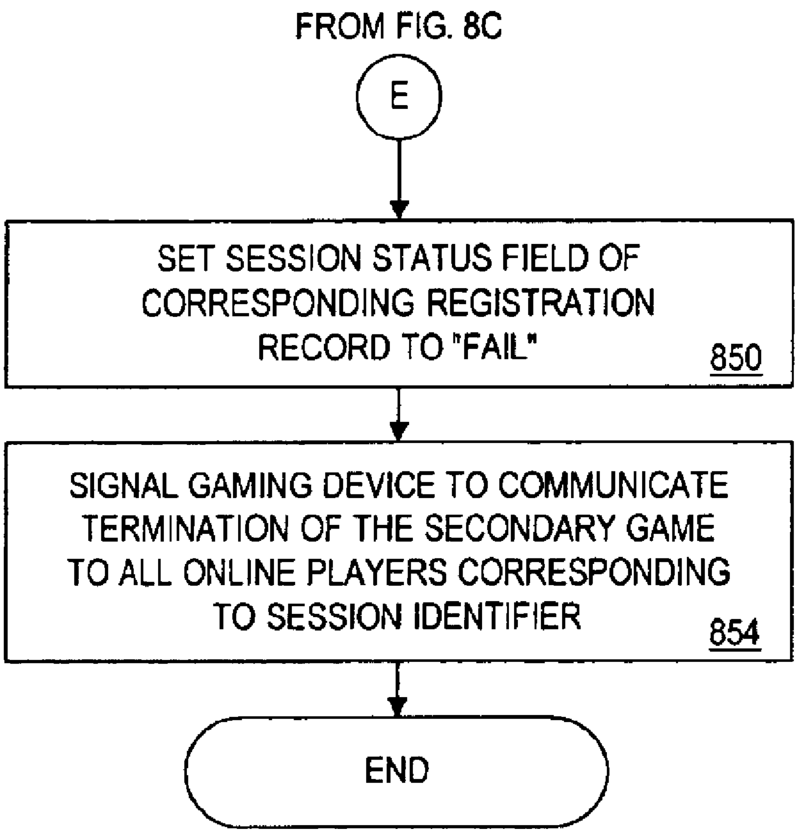

Referring now to FIG. 8E, there are illustrated the steps processor 210 executes if a player fails to complete the game requirements within the allotted time or number of plays. At block 850, processor 210 sets session status field 620 of the corresponding record of registration table 600 to "FAIL." At block 854, processor 210 causes a signal to be transmitted to every client gaming device on which a player associated with the session identifier is playing. The signal directs the client gaming devices to display a message indicating that the player secondary game has ended unsuccessfully.

Figure 8F:
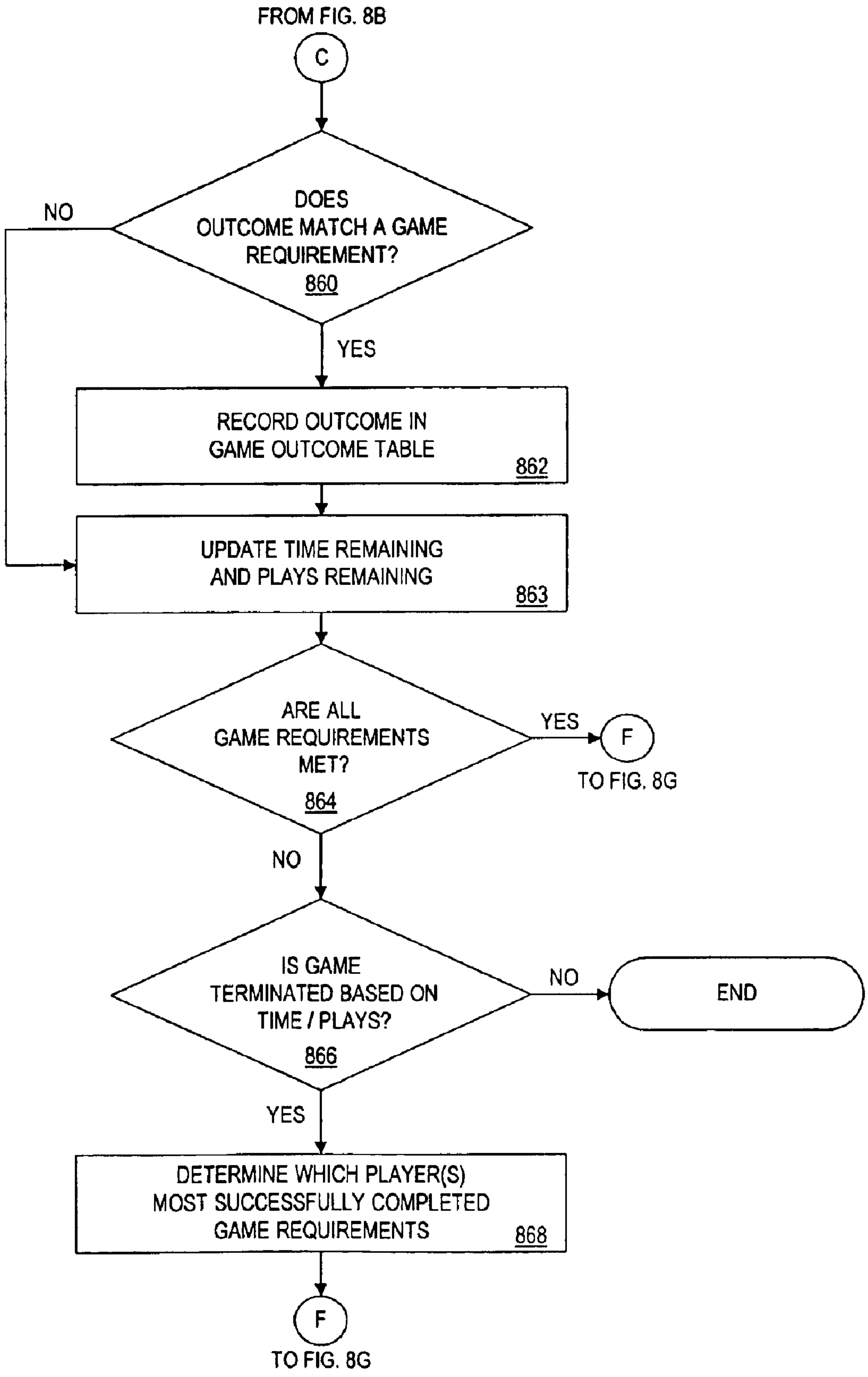
Figure 8G:
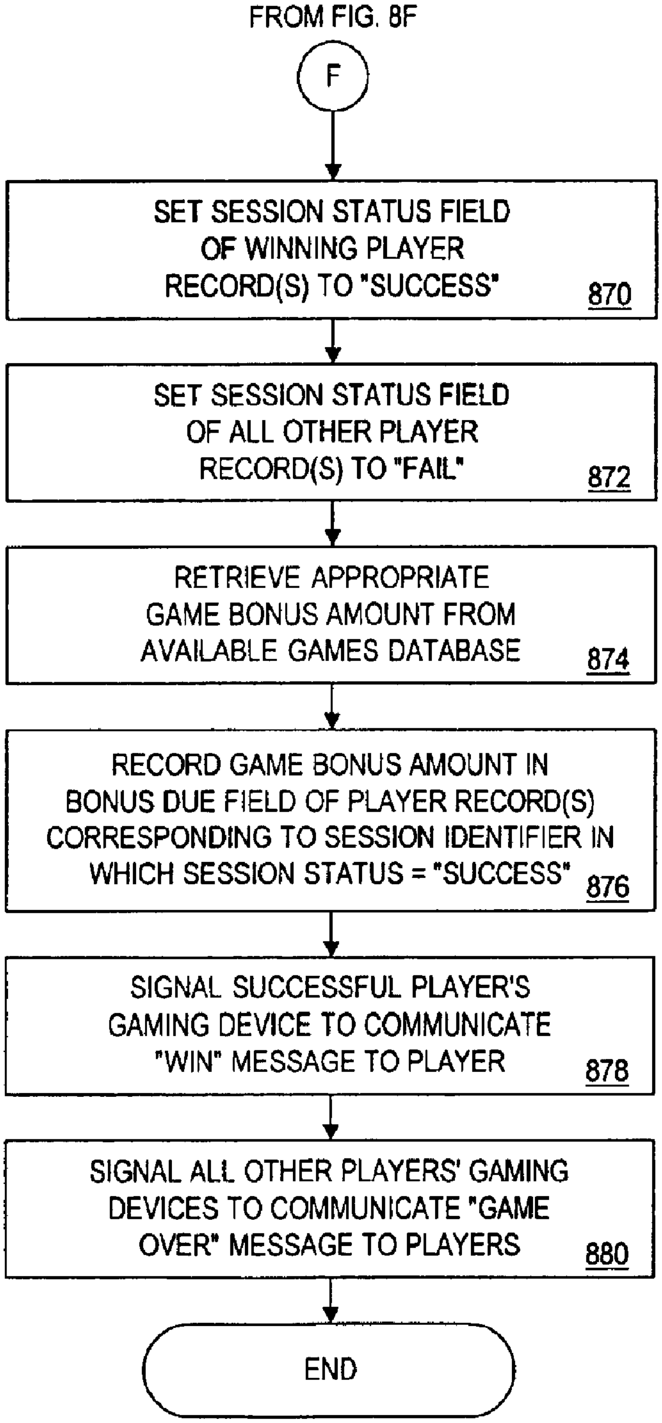

Referring now to FIGS. 8F and 8G, there are illustrated the steps processor 210 executes if the corresponding session identifier is associated with a competitive multi-player game. At decision block 860, processor 210 determines whether the outcome, or any portion of the outcome, matches a game requirement. If the outcome fulfills a game requirement, the outcome is recorded in game outcome table 700, as shown by block 862. At block 863, the time remaining and plays remaining fields of registration table 600 are updated. Processor 210 then determines whether all of the game requirements have been met at decision block 864. If all of the game requirements have been satisfied, processing is directed to block 870 of FIG. 8G. Otherwise, processor 210 determines whether the game should be terminated due to the lack of remaining time or remaining plays. According to decision block 866, if the game should be terminated, processing is directed to block 868. Otherwise, the secondary game control process terminates.

At block 868, processor 210 determines which players most successfully completed the game requirements. Pursuant to blocks 870 and 872, respectively, session status field 620 of the corresponding record of registration table 600 is updated to "SUCCESS" for all winning players and "FAIL" for all other players. Although not shown by secondary game table 500, multi-player games may be defined in which a bonus may be awarded for multiple levels of achievement, such as first place, second place and third place. Processor 210 then retrieves game bonus amount 520 from the appropriate record of secondary game table 500 and stores the retrieved amount in the bonus due field 622 of the corresponding records of registration table 600, as shown by blocks 874 and 876. At block 878, processor 210 causes a signal to be transmitted to all client gaming devices on which a winning player associated with the session identifier is playing. The signal directs the client gaming devices to display a message indicating that the player has successfully completed the game requirements. At block 880, processor 210 causes a signal to be transmitted to all client gaming devices on which a losing player associated with the session identifier is playing. The signal directs the client gaming devices to display a message indicating that the player has failed to successfully complete the game requirements.

FIGS. 8F and 8G assume that the secondary game incorporates a time/plays limit, and that if the time/plays limit is reached the player having met the most game requirements is deemed to be the winner. Of course, the secondary game process could be easily modified to require a winner to complete all of the game requirements by eliminating block 868 from the process of FIG. 8F and setting session status field 620 of all of the participating players to "Fail" at block 872 of FIG. 8G.

Referring now to FIG. 9, there are illustrated the steps of an exemplary redemption process. The redemption process is typically initiated by a player who has registered for and successfully completed the game requirements of a secondary game of chance. The redemption process is typically performed by server 200 operating in conjunction with kiosk 400.

At block 910, server 200 receives a request to provide a game bonus amount to a player. The request is received via kiosk 400 and includes a player identifier identifying the requesting player and a session identifier identifying the session during which the player achieved a game bonus. Server 200 retrieves the record from registration table 600 which corresponds to the received session identifier and player identifier, as shown by block 912.

Server 200 determines whether the player successfully completed the session by comparing session status field 620 to "SUCCESS" at block 914. If the identified session does not have an associated status of "SUCCESS," server 200 prompts kiosk 400 to display a message indicating that the request is invalid, as shown by block 916, and the redemption process terminates. If the player successfully completed the session, server 200 causes the appropriate payout to be provided based on the contents of bonus due field 622, as shown at block 918. At blocks 920 and 922, respectively, bonus due field 622 is zeroed and session status field 620 is updated to "PAID" to reflect payment of the bonus. The game bonus may be automatically dispensed by kiosk 400, or manually dispensed by a casino attendant. In an alternate embodiment, the redemption process could be executed by the gaming device at which the final game requirement is completed, or executed by any client slot machine. It should be noted that a bonus award earned by a team may be dispensed in a number of ways in accordance with the present invention. For example, each team member may receive the entire bonus amount, each team member may receive an equal share of the bonus amount, or each player may receive a share of the bonus amount proportional to the game requirements achieved by the player.

Bonus payout amounts could be adjusted based on the time to successful completion, with shorter completion times associated with relatively larger bonus payout amounts. Bonus payout amounts could also be supplemented in order to encourage play at off-peak hours, such as during early morning hours. In order to encourage a faster rate of play, the casino could offer higher bonus payout amounts to those players maintaining a high average rate of play. For example, a player completing a secondary game with a seven hundred handle pull-per-hour average rate of play might receive 10% more than a player maintaining a rate of only five hundred handle pulls-per-hour for the same secondary game structure.

Figure 10:
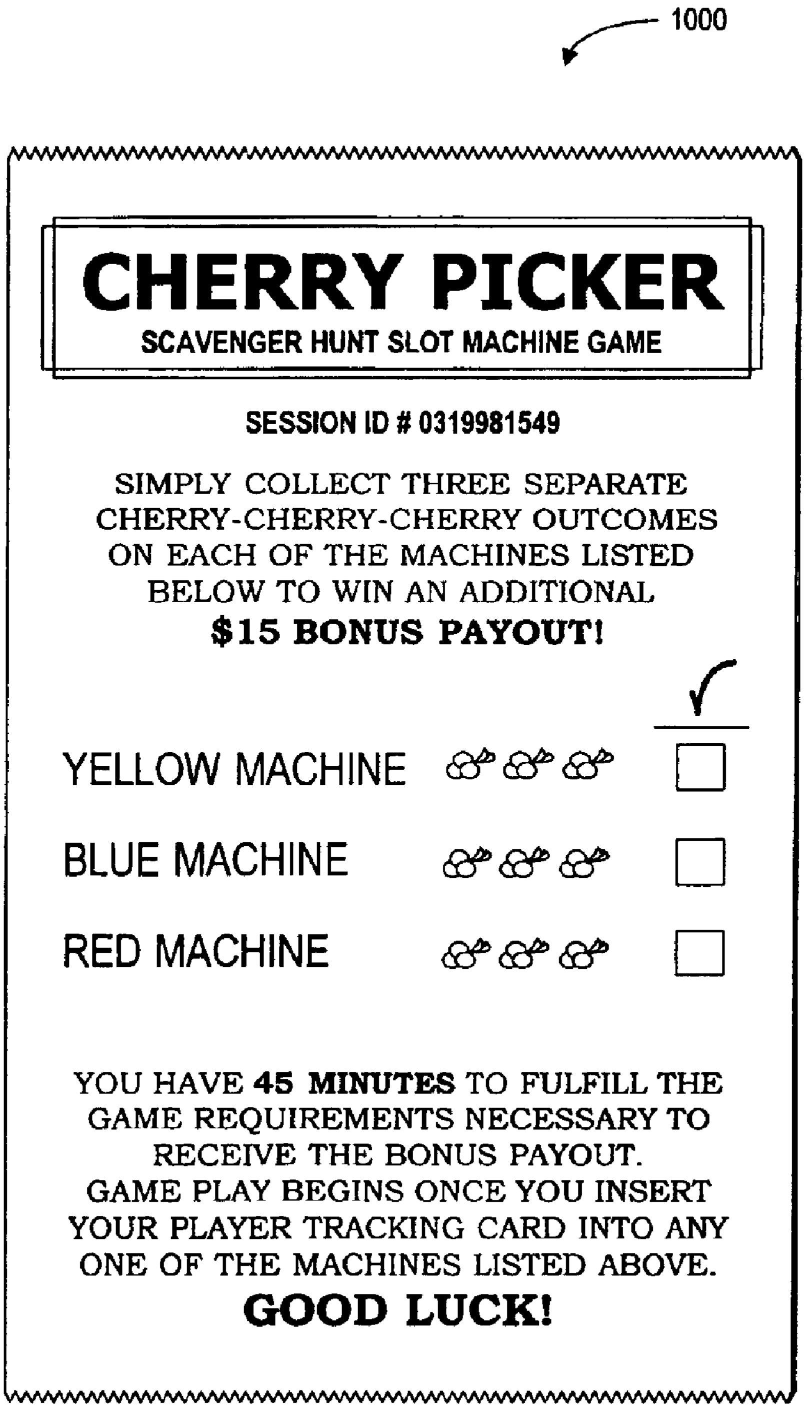
FIG. 10 is a plan view of a game receipt generated in accordance with the present invention.

Referring now to FIG. 10, there is illustrated an exemplary game receipt 1000 that may be provided to a registered player. Game receipt 1000 acts as proof of registration for a secondary game session and provides a convenient reminder to the player of the game requirements, time limit and bonus amount associated with the secondary game. Game receipt 1000 further directs the player to the appropriate gaming devices, and may provide instructions regarding redemption of an earned bonus. As shown, game receipt also includes check boxes enabling the player to track his progress toward successful completion of the game requirements.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

What is claimed is:

1. A method for directing a computing device to register a player to play a secondary game of chance at a slot machine, the method comprising the steps of:

receiving a request to register the player to play the secondary game of chance, the request to register including a player identifier;

determining a secondary game identifier corresponding to the secondary game of chance, the secondary game identifier associated with a plurality of client identifiers, each client identifier corresponding to a slot machine configured to facilitate a primary game of chance and the secondary game of chance; and storing the player identifier, the secondary game identifier and the plurality of client identifiers, thereby registering the player for the secondary game of chance.

2. The method of claim 1 wherein the step of determining further includes determining at least one completion parameter associated with the secondary game of chance.

3. The method of claim 2 wherein the at least one completion parameter defines a maximum number of plays in which to successfully complete the secondary game of chance.

4. The method of claim 2 wherein the at least one completion parameter defines a maximum duration of time in which to play the secondary game of chance.

5. The method of claim 2 wherein the at least one completion parameter comprises a set of game requirements.

6. The method of claim 1 further including the steps of:

selecting at least one of the plurality of client identifiers; and outputting a description of the at least one slot machine corresponding to the at least one selected client identifier.

7. The method of claim 1 further including the step of:

determining a minimum number of client machines on which the player must play to receive a secondary game bonus.

8. The method of claim 1 further including the step of:

determining a maximum number of client machines on which the player may play to receive a secondary game bonus.

9. The method of claim 1 further including the step of:

receiving pre-payment for the secondary game of chance.

10. The method of claim 9 further including the step of:

receiving pre-payment for the primary game of chance.

11. The method of claim 1 wherein the step of receiving further includes receiving a second player identifier corresponding to a second player, the player and the second player comprising a team, and the step of storing further including storing the second player identifier.

12. The method of claim 1 further comprising the steps of:

communicating a plurality of secondary games of chance to the player; and receiving a player selection identifying one of the plurality of secondary games of chance.

13. A registration kiosk, comprising:

a processor;

a memory connected to said processor storing a program to control the operation of said processor;

said processor operative with said program in said memory to:

receive a request to register the player to play the secondary game of chance, the request to register including a player identifier, determine a secondary game identifier corresponding to the secondary game of chance, the secondary game identifier associated with a plurality of client identifiers, each client identifier corresponding to a slot machine configured to facilitate a primary game of chance and the secondary game of chance, and store the player identifier, the secondary game identifier and the plurality of client identifiers, thereby registering the player for the secondary game of chance.

14. A computer-readable storage medium encoded with processing instructions for implementing a method for directing a computing device to register a player to play a secondary game of chance at a slot machine, said processing instructions for directing a computer to perform the steps of:

receiving a request to register the player to play the secondary game of chance, the request to register including a player identifier;

determining a secondary game identifier corresponding to the secondary game of chance, the secondary game identifier associated with a plurality of client identifiers, each client identifier corresponding to a slot machine configured to facilitate a primary game of chance and the secondary game of chance; and storing the player identifier, the secondary game identifier and the plurality of client identifiers, thereby registering the player for the secondary game of chance.

* * * * *